Dec. 5, 1933. M. GOLDKIND 1,938,141
PORTABLE ELECTRIC REFRIGERATOR AND CASING THEREFOR
Filed May 19, 1932 2 Sheets-Sheet 1

Inventor
Mordecai Goldkind,
By Mason & Mason.
Attorney

Dec. 5, 1933.  M. GOLDKIND  1,938,141
PORTABLE ELECTRIC REFRIGERATOR AND CASING THEREFOR
Filed May 19, 1932  2 Sheets-Sheet 2
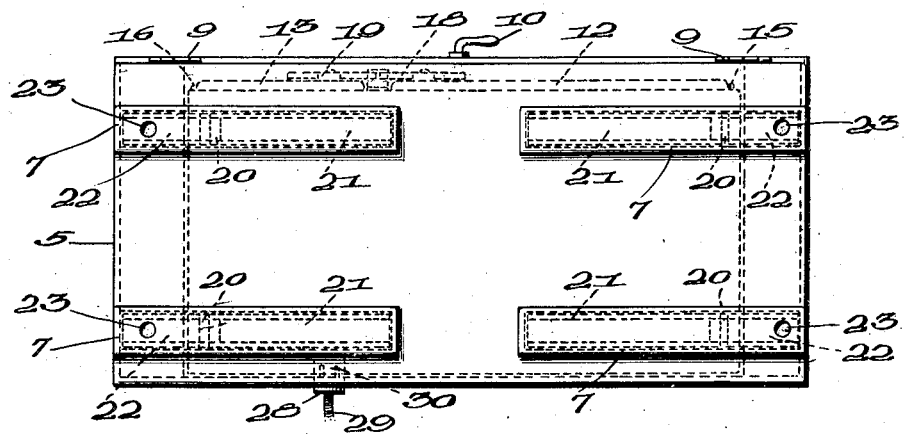
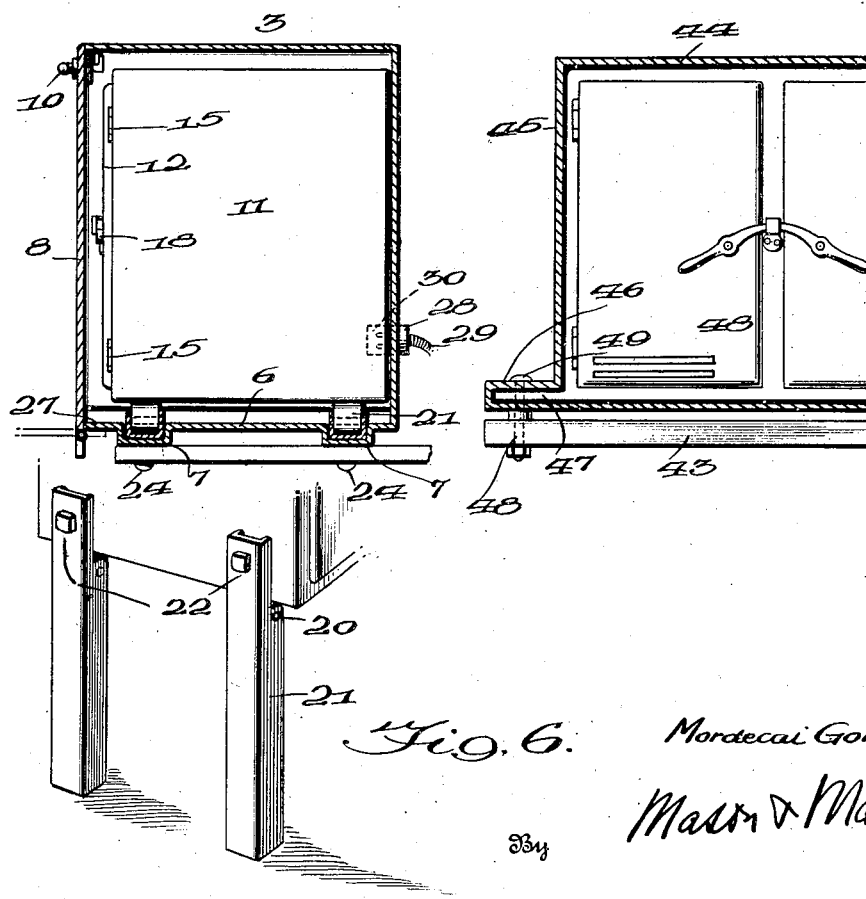
Inventor
Mordecai Goldkind,
By Mason & Mason.
Attorney Patented Dec. 5, 1933

1,938,141

UNITED STATES PATENT OFFICE 1,938,141

PORTABLE ELECTRIC REFRIGERATOR AND CASING THEREFOR

Mordecai Goldkind, Washington, D. C.

Application May 19, 1932. Serial No. 612,314

8 Claims. (Cl. 62—117)

My invention relates to improvements in portable electric refrigerators.

An object of the invention is to provide a portable electric refrigerator which may be attached to the trunk rack of a motor vehicle.

Another object of the invention is to provide a portable electric refrigerator carried by a motor vehicle, the electrical motor of which can be plugged into the electrical system of the motor vehicle so as to furnish current from the battery or generator of the motor vehicle for operating the electric motor of the refrigerator.

Another object of the invention is to provide a portable electric refrigerator which may be readily attached and detached from the trunk rack of a motor vehicle.

Another object of the invention is to provide a portable electric refrigerator which may be carried by a motor vehicle and which may be readily detached and used as a table at picnics, etc.

Still another object of the invention is to provide a portable electric refrigerator which may be readily detached from a motor vehicle which carries the same, and used as a domestic refrigerator or table or both in the home of the user.

Still another object of the invention is to provide a portable electric refrigerator having folding legs with securing means for securing the refrigerator to the trunk and/or the trunk rack of a motor vehicle.

Other objects and advantages will appear hereinafter throughout the specification.

In the drawings:—

Fig. 3 is a plan view of the bottom of the refrigerator casing;

Fig. 4 is a sectional view, taken on the line 4—4 of Fig. 2;

Fig. 5 is an elevation of a modification of the refrigerator and casing, the casing being in section, and Fig. 6 is a view in perspective of the refrigerator illustrated in Figs. 1 to 4, with the legs of the refrigerator shown in unfolded position.

In the present embodiment of the invention the motor vehicle 1 is provided with a trunk rack 2, preferably located in the usual position between the rear fenders of the motor vehicle.

Figure 1:
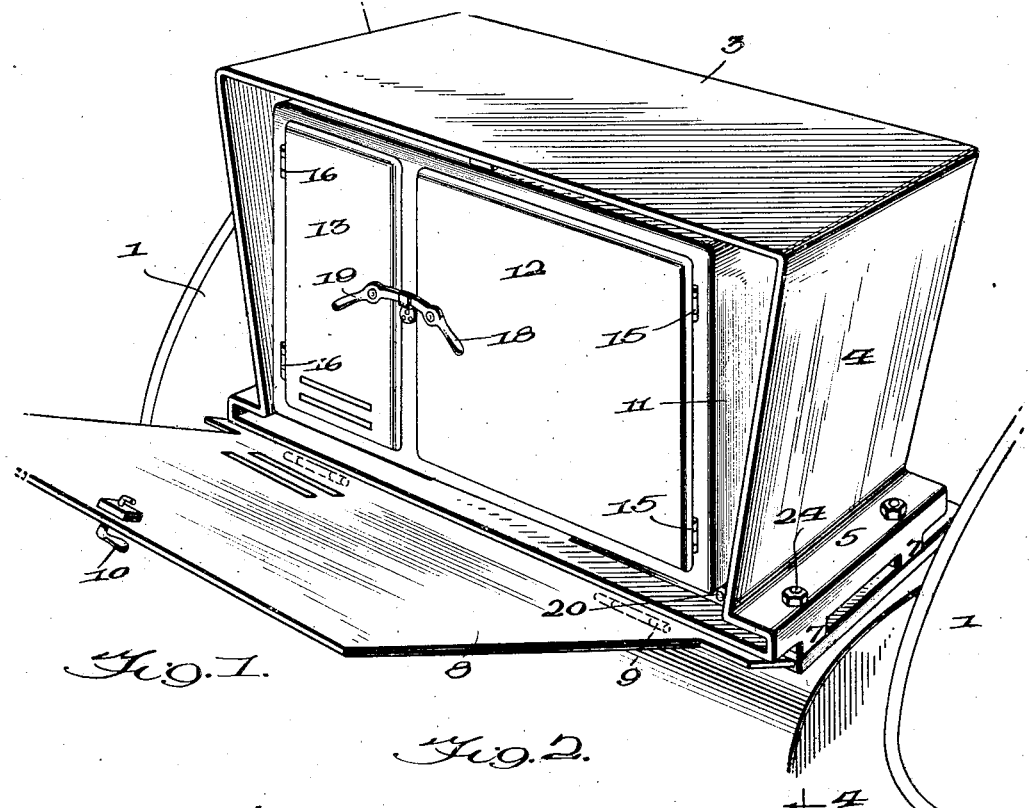
Fig. 1 is a perspective view of the improved electric refrigerator and trunk for the same mounted on the trunk rack of a motor vehicle in the rear thereof.
Figure 2:
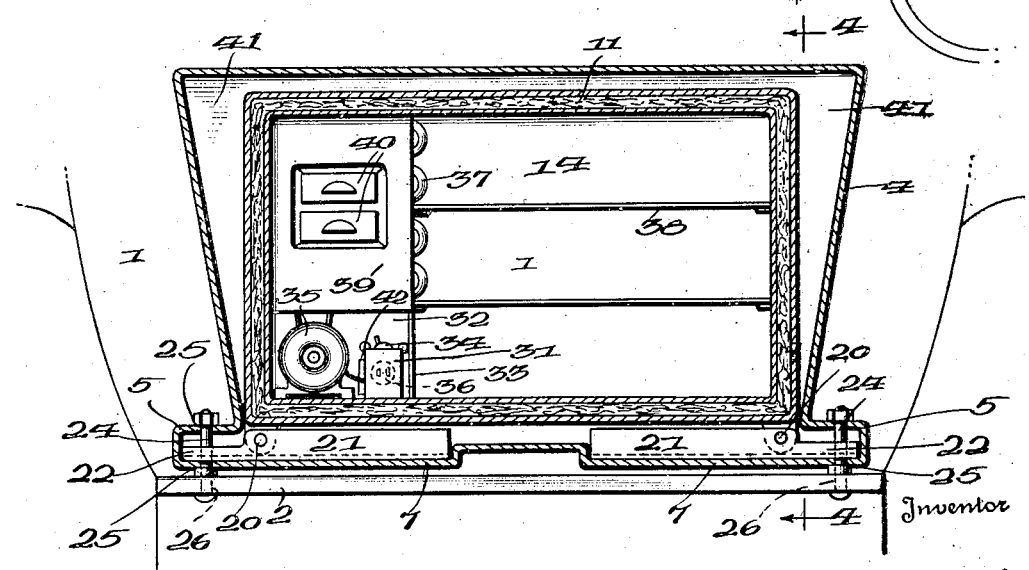
Fig. 2 is a vertical section of the structure illustrated in Fig. 1.

Upon the trunk rack 2 I propose to mount a trunk or casing of special construction such as is illustrated particularly in Figs. 1, 2, 4 and 5. As shown in Fig. 1, the trunk is indicated by the numeral 3. The trunk 3 is provided with slanting side portions 4 terminating in shoulders 5. The bottom of the trunk 6 is provided with four depressions 7 for the reception of the legs of the refrigerator. The trunk is provided with a door 8 which is hinged at 9 and has a suitable latch 10 for holding the same closed.

In the embodiment illustrated in Fig. 1, the refrigerator is indicated by the numeral 11, and is provided with two hinged doors 12 and 13, the former providing admittance to the refrigerator compartment 14, and the latter providing access to the mechanical appurtenances hereinafter to be described. The refrigerator door 13 as well as the door 8 of the trunk may be provided with suitable apertures as shown for the ingress and egress of heated air. The doors 12 and 13 are hinged to the refrigerator body at 15 and 16, respectively, and have also provided thereon latches 18 and 19, respectively. Pivoted at 20 are a plurality of legs 21 which are preferably constructed of sheet metal and channel shaped, as indicated in Fig. 6 of the drawings. Each of the legs 21 is provided with an extension 22 which acts as a brace when the legs are in unfolded position, as shown in Fig. 6, to prevent the legs from pivoting to any greater extent than that of a vertical position when the refrigerator has been removed from the trunk and when supported by the legs. Each of the legs is also provided with an aperture 23.

When the refrigerator is in the trunk, the extensions 22 extend within the hollow shoulders 5. In this position, bolts 24 may be passed through perforations 25 in the shoulders 5, and through suitable perforations 26 in the trunk rack. The shoulders 5 provide a space in order that when the refrigerator is slid within the trunk 4, the legs 21 will clear the front portion 27 of the bottom of the trunk. The refrigerator may then be lowered into position with the legs 21 fitting snugly within the pressed-out portions 7 of the casing or trunk. The bolts 24 may be passed through the holes in the shoulders 5, legs 21, and trunk rack 2. In this position the bolts thus secure together the trunk, refrigerator, and trunk rack. However, in order that there may be no rattling or moving of the refrigerator and its parts relative to the trunk, the trunk has been shown with the depressed portions 7 which accurately position the legs of the refrigerator, in their proper positions within the trunk. Thus secured, there is no liability of the refrigerator or legs rattling or jarring about within the trunk during the travel of the motor vehicle. The rear of the trunk is provided with a plug 28 having a connection 29 to the battery of the motor vehicle, or to a part of the electrical circuit of the same. The rear of the refrigerator is provided with a socket 30 for the reception of the plug when the refrigerator has been positioned within the trunk.

With the construction shown and described, when the refrigerator has been inserted within the trunk, an electric circuit is completed with the electrical system of the motor vehicle. However, while this may be the case, I prefer to provide a switch indicated by the numeral 31 within the compartment 32 formed by the partition 33 in the refrigerator. This switch is provided with an operating member 34 for making or breaking the switch. If the switch is on when the refrigerator is inserted within the trunk, an electric circuit is completed, but ordinarily this switch is in off position. I may also provide a suitable outlet at the rear of the compartment 32 for the egress of heated air. The partition 33 is intended to act as an insulated means to prevent the heated air within the compartment 32 from finding its way into the refrigerator chamber indicated by the numeral 14.

The numeral 35 indicates a suitable electric motor preferably of the universal type, in order that it may be run by either D. C. or A. C. current. The switch 31 has a socket 36, in order that when the refrigerator has been detached from the motor vehicle and set within a house, or other dwelling, an electrical connection can be completed with the house current. The numeral 37 indicates the cooling coils, 38 trays for supporting food, and 39 the container for the ice drawers 40.

It will be seen that the above construction provides a very useful article. The refrigerator may be used for long trips, and when it is desired to remove the refrigerator at a camping place, the same may be taken out of the case, set up on the ground or elsewhere, and used as a table. The refrigerator may be connected directly to the electrical system of the motor vehicle and under some conditions a larger battery and generator may be installed in the motor vehicle. I contemplate, however, using an electrical motor and compressor as well as other electrical parts of smaller size than provided in the electrical refrigerators now on the market. The refrigerator may be readily removed and set up in a house, or other dwelling, it being only necessary after the refrigerator has been set up, to connect by means of a wire and plug, the socket 36. The parts may then be driven by the house current. I have not shown a compressor and other parts within the compartment 32. While the parts may be constructed of any suitable material, I prefer that both the refrigerator and trunk be made of sheet metal. The depressions of the trunk are pressed out of the sheet of metal 6, constituting the bottom of the trunk.

The space 41 provided between the trunk and the casing may be used to carry knives, forks, spoons and plates, and other camping or picnic equipment. The refrigerator may also be provided with a suitable transformer indicated at 42.

The apertures 23 may be used to secure the legs in unfolded positions (Figure 6), by providing bolts extending through holes 23 to the sides of the refrigerator. Braces may also be provided to prevent folding of the legs 21 when used to support the refrigerator, but this detail is not a part of my invention.

Fig. 5 illustrates a modification of my improvements wherein there is provided a trunk rack 43 having mounted thereon a trunk or casing 44 having straight sides 45 and a shoulder 46 which houses the flange 47 on either side of the refrigerator 48. The single securing means consisting of bolts 49 extends through the shoulders 46 and apertures in the flanges 47, and through apertures 48 of the trunk rack 43. In this embodiment of my invention, there are no foldable legs provided, the refrigerator being rigidly secured to the trunk, and both the refrigerator and trunk being secured to the trunk rack by means of the bolts 49.

My invention is pioneer in that I am the first to provide an electric refrigerator adapted both to be carried on a motor vehicle, and driven thereby, and which may be readily detached and set up in an apartment or house, and driven by the ordinary house current. The mechanical parts of the refrigerator including the electric motor, compressor, condenser coils, have not been shown in detail, as I do not claim these parts specifically, but only in combination with other parts of my invention. It will also be realized in order that the electric refrigerator may be driven by the battery of the motor vehicle, or by the generator of the same, or both, these parts would be constructed of smaller size than the electric refrigerators now on the market. The generator and battery of the motor vehicle with which my improvements are used, may be larger than that ordinarily provided.

It will be understood that by the term motor vehicle in the specification and claims, I mean to include any self-propelled vehicle whether driven by steam, gasoline, or electricity.

I desire to comprehend within my invention all modifications which are within the scope of the appended claims. It is to be understood that the drawings and specification are for illustrative purposes only, and that other embodiments and modifications may be embraced within my invention.

Having thus described my invention, what I claim is:—

1. In combination with a vehicle, a trunk rack, a trunk mounted on said trunk rack, an electric refrigerator within said trunk, said refrigerator having a plurality of legs, said legs having extensions, and a single means extending through a portion of said trunk and leg extensions for positioning the trunk and refrigerator upon the trunk rack.

2. In combination with a motor vehicle, a trunk rack mounted on said motor vehicle, a trunk mounted on said trunk rack, said trunk rack having a plurality of pressed out portions in the bottom thereof, a refrigerator mounted in said trunk, a plurality of foldable legs on said refrigerator fitting within said depressions when the refrigerator is mounted within the trunk.

3. In combination with a vehicle, a trunk mounted on said vehicle, a hinged door on said trunk, a refrigerator mounted within said trunk, a plurality of legs on said refrigerator each of said legs having an extension, and means for attaching said trunk and the extensions of said legs to said vehicle.

4. In combination with a vehicle, a refrigerator mounted on said vehicle, a plurality of pivoted legs mounted on said vehicle, extensions on said legs, said extensions forming braces when said legs are unfolded, and said extensions having means for attaching the same to said vehicle.

5. In combination, a vehicle provided with an electrical system, said electrical system having an electrical connection, an electrical refrigerator having a storage compartment and a motor compartment means for detachably mounting said refrigerator on said motor vehicle and additional means for supporting said refrigerator on a stationary support and having an electrical connection suitable for making electrical contact with said electrical connection first named, said second named electrical connection being constructed and adapted to connect with house current.

6. In combination, an electrical refrigerator, having a storage compartment and a motor compartment means for detachably mounting said refrigerator upon a vehicle, means including a universal electric motor forming part of the electrical system of said refrigerator for connection to the electrical system of a vehicle or to city current when said refrigerator has been removed from said motor vehicle.

7. In an electric refrigerator, said refrigerator including an electrical motor, means for detachably mounting said refrigerator upon a motor vehicle and separate means for supporting said refrigerator after the same has been removed from said motor vehicle, whereby said refrigerator may be supported on a stationary surface, and electrical means whereby said refrigerator motor may be electrically connected to the electrical system of a motor vehicle or may be connected to an outlet for city current.

8. In combination with a vehicle, a trunk rack mounted on said vehicle, a trunk mounted on said trunk rack, a refrigerator mounted within said trunk, said trunk having a shoulder, and means secured to said trunk rack and extending through said shoulder and a portion of said refrigerator for securing said refrigerator and trunk to said trunk rack.

MORDECAI GOLDKIND.